(12) United States Patent
Murata et al.

(10) Patent No.: US 6,483,550 B1
(45) Date of Patent: Nov. 19, 2002

(54) VIDEO SIGNAL LEVEL CONVERTING DEVICE AND VIDEO SIGNAL ANALOG-TO-DIGITAL CONVERTER

(75) Inventors: Hisaji Murata, Katano (JP); Toshihiro Miyoshi, Taisho-ku (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/320,462

(22) Filed: May 27, 1999

(30) Foreign Application Priority Data

May 29, 1998 (JP) .......................................... 10-149031

(51) Int. Cl.⁷ ............................. H04N 5/14; H04N 9/64
(52) U.S. Cl. ...................... 348/572; 348/571; 348/708; 348/712
(58) Field of Search ................................. 348/572, 571, 348/708, 712, 705, 706, 558; H04N 5/14, 9/64, 5/268

(56) References Cited

U.S. PATENT DOCUMENTS 6,226,046 B1 * 5/2001 Yamagata et al. .......... 348/558

FOREIGN PATENT DOCUMENTS

| JP | 58-56593 | 4/1983 |
| JP | 7-255001 | 10/1995 |
| JP | 8-214332 | 8/1996 |
| JP | 8-265798 | 10/1996 |

OTHER PUBLICATIONS

Transistor Art Special, No. 52, p. 115 ,<Fig. 1> (CQ Publishing 1995) with its English translation.

Kubota, Yukio, Digital Video Tokuhon, (1995), [Textbook For Digital Video], Ohmsha, p. 41 with its English partial translation.

* cited by examiner

*Primary Examiner*—Sherrie Hsia
(74) *Attorney, Agent, or Firm*—Parkhurst & Wendel, L.L.P.

(57) ABSTRACT

An analog-to-digital converter for converting an analog television signal to a signal in compliance with a digital encoding standard is provided. The analog-to-digital converter according to the invention comprises an A-D converter circuit for converting an analog television signal to a $2^n$-bit digital signal, a synchronizing signal detecting circuit for detecting a synchronizing signal from the digital signal received from the A-D converter circuit, a Y/C separating circuit for separating a luminance signal and a carrier chrominance signal from the digital signal from the A-D converter circuit using the synchronizing signal from the synchronizing signal detecting circuit, a synchronizing signal converter circuit for converting a synchronizing signal portion of the luminance signal into a predetermined value, and a digital amplifying circuit for digitally amplifying the signal level from the synchronizing signal converter by a predetermined multiple value specified by a standard for communication or for video signal apparatus. The digital amplifying circuit may be composed of a shifter. A low pass filter may be used additionally to eliminate rounding errors. Further, depending on the type of video signal, the low pass filter may be bypassed.

11 Claims, 14 Drawing Sheets

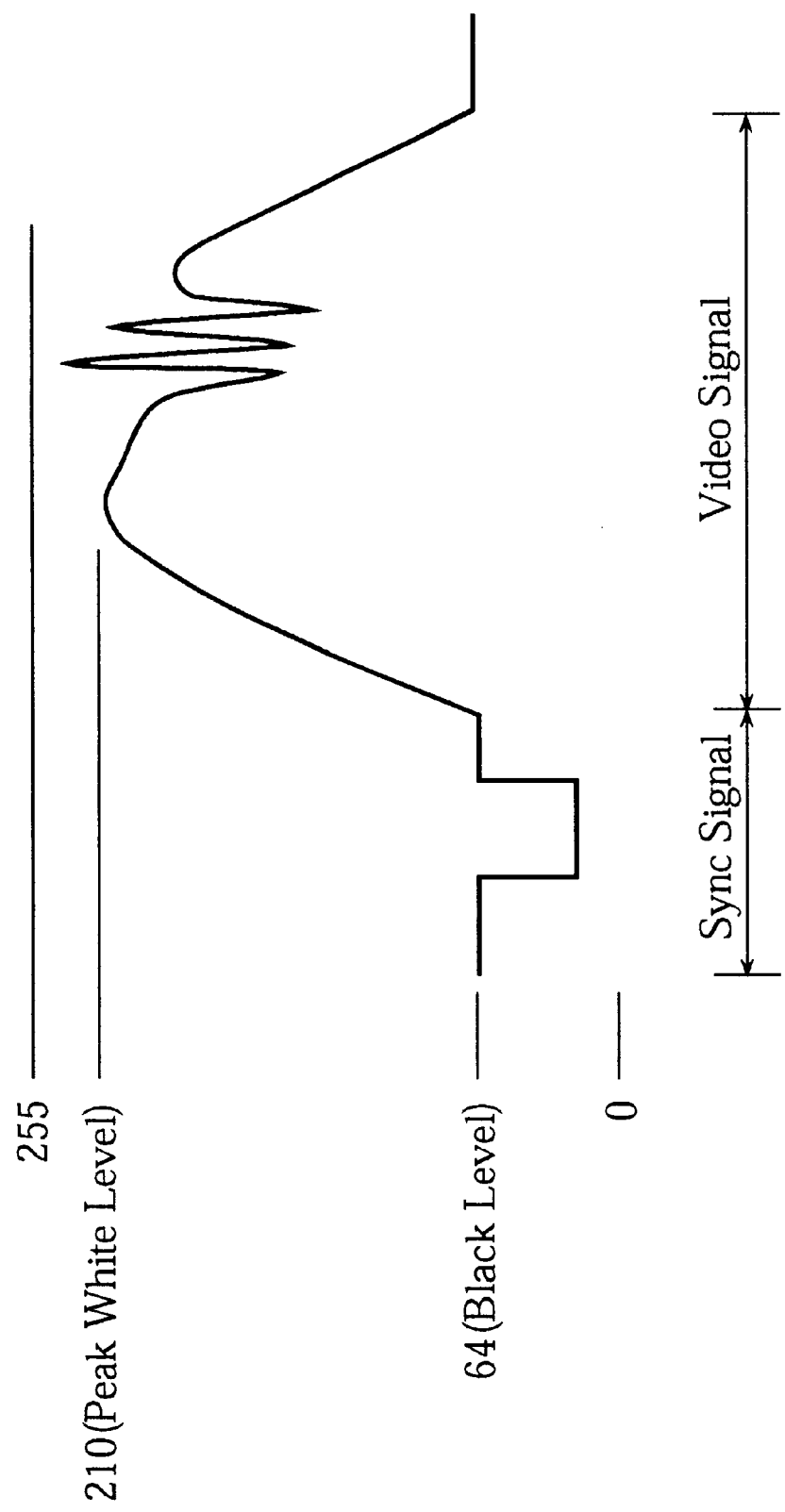

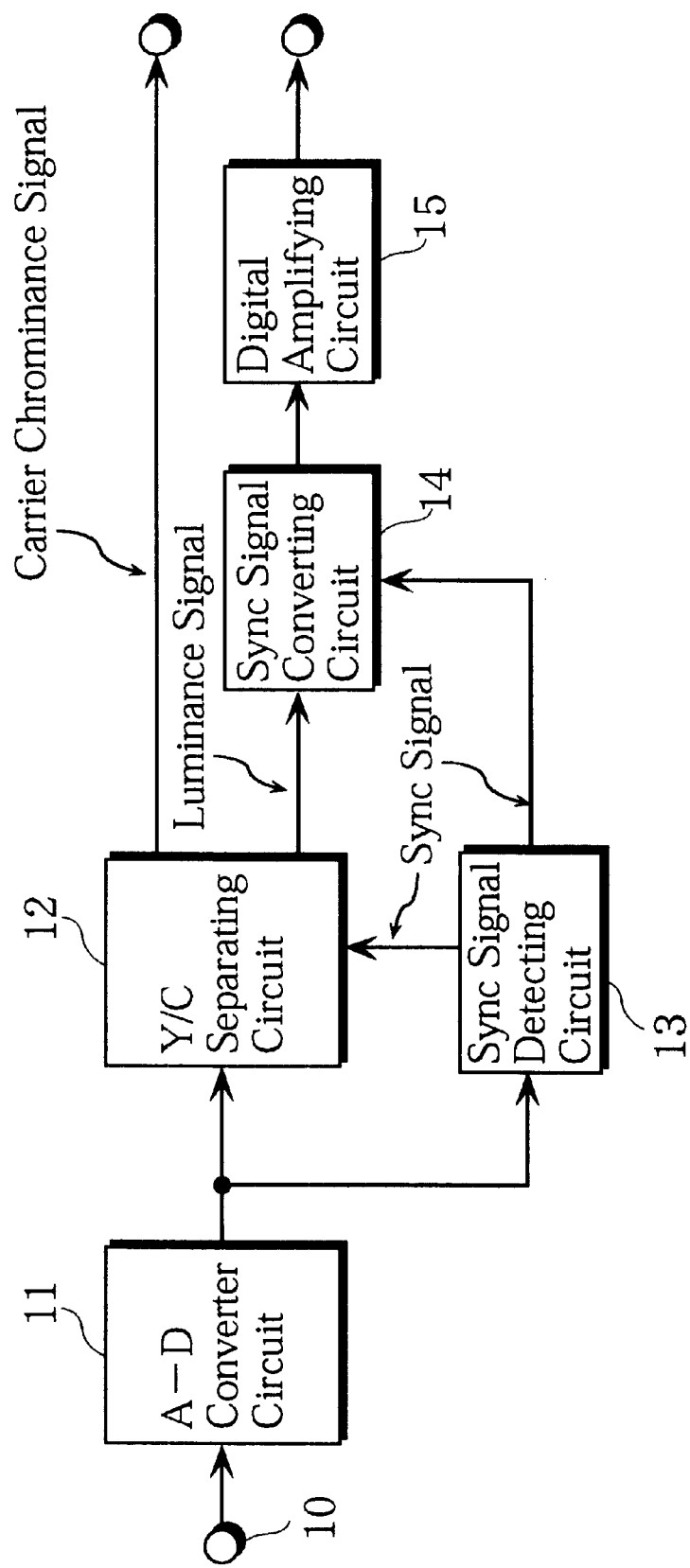

VIDEO SIGNAL LEVEL CONVERTING DEVICE AND VIDEO SIGNAL ANALOG-TO-DIGITAL CONVERTER

BACKGROUND OF THE INVENTION (1) Field of the Invention

The present invention relates to a video signal processing system, and particularly to a device for converting an analog television signal into a signal in compliance with a certain standard for digital encoding.

(2) Description of the Prior Art

In recent years, appliances capable of recording low noise video images by digitally processing video signals, such as DVC (Digital Video Cassette) and the like, have become available in the market. In line with the development of such appliances, a device for converting an analog television signal to a digital signal in compliance with a certain digital encoding standard has been increasingly demanded.

A standard for the analog television signal, for example in NTSC system, is specified in EIA standard RS-170. The signal according to this standard comprises, as shown in FIG. 1, a video signal portion that includes a luminance signal and a carrier chrominance signal, and a synchronizing signal portion that is used for synchronizing operation to reproduce a picture in a television receiver. The signal levels for each of the signals are specified to be that, when a signal level of the synchronizing signal is 40, the video signal has a signal level difference between a black level and a peak white level of 100.

A standard for a digital encoding is specified, for example, in ITU-R Recommendation BT601 as a digital encoding standard for a component signal. This standard specifies a sampling frequency, a signal level for quantization, etc. in converting an analog luminance signal and an analog carrier chrominance signal to digital signals. For NTSC system, for example, it is stated that no synchronizing signal is used, and that in the luminance signal a sampling frequency for sampling analog data is 13.5 MHz, and signal levels for quantization are a black level being 16/255 (=$2^8$-1), and a peak white level being 235/255 when one sample is expressed (converted) by eight bits.

As described above, between these two standards, there is a difference in a video signal level as shown in FIG. 2. In FIG. 2, on the left is a video signal according to the EIA standard RS-170, and on the right is a video signal according to the ITU-R Recommendation BT601. Thus, a need to adjust the difference arises in converting analog video signals to digital signals.

In conjunction with the above, a prior art device for converting an analog television signal to a digital signal in compliance with a digital encoding standard is now described with reference to the figures.

FIG. 3 shows a construction of a prior art analog-to-digital converter. In the figure, there are shown an upstream A-D converter circuit 111, a downstream A-D converter circuit 112, a Y/C separating circuit 12, an upstream synchronizing signal detecting circuit 131, a downstream synchronizing signal detecting circuit 132, a D-A converter circuit 31, an amplifying circuit 32, and a synchronizing signal converting circuit 14. The operation of this prior art device is as follows.

An analog television signal, such as a signal for NTSC system, is supplied from an input terminal 10 into the upstream A-D converter circuit 111, and converted therein to an 8- digital signal. As for signal levels of the output signal from this A-D converter circuit, the black level is made to be, for example, 64/255 and a peak white level is 210/255, as shown in FIG. 4. The upstream synchronizing signal detecting circuit 131 receives the 8-bit digital signal and detects a synchronizing signal from the 8-bit digital signal. The Y/C separating circuit 12 separates a luminance signal and a carrier chrominance signal from the 8-bit digital signal using the detected synchronizing signal, and thereby a composite signal, which contains a synchronizing signal, a luminance signal, and a carrier chrominance signal, is converted into a component signal in which a signal containing the luminance signal and a synchronizing signal is separated from a carrier chrominance signal. The separated luminance signal is converted back to an analog signal by the D-A converter circuit 31, and amplified by the amplifying circuit 32 so that the signal level between the black level and the peak white level becomes 1.5 times larger than that of the input signal. The amplified luminance signal is then converted back to an 8-bit digital signal by the downstream A-D converter circuit. As for signal levels of the output signal from the A-D converter circuit 112, the black level is made to be 16/255 and the peak white level is 235/255, as in the waveform shown on the right of FIG. 2. The downstream synchronizing signal detecting circuit 132 detects a synchronizing signal from the output signal from the amplifying circuit 32. The synchronizing signal converting circuit 14 uses the synchronizing signal received from the synchronizing signal detecting circuit 32 to fix a synchronizing signal portion of the luminance signal to be, for example, 16/255, and output a video portion of the luminance signal without changing. Finally, the carrier chrominance signal and the luminance signal are separately output to a display (not shown), and thus a better picture is attained than a picture obtained in the case where the output signal to the display is such that the carrier chrominance signal and the luminance signal are combined.

According to such a construction described above, an analog television signal, such as a signal for NTSC system, can be converted to a digital signal in compliance with a digital encoding standard. However, the above-described circuit construction has such a drawback that, after converted to a digital signal by the upstream A-D converter circuit 111, the input signal is required to be converted back to an analog signal by in the D-A converter circuit 31 and converted back again to a digital signal by the downstream A-D converter circuit 112, thereby causing the deterioration of a signal-to-noise ratio. Furthermore, to change the signal level of the luminance signal, a plurality of A-D converter circuits as well as a D-A converter circuit are required, therefore the cost is increased.

In view of the above drawbacks, a video signal processing system having an improved signal-to-noise ratio, having a small circuit size, and being cost-effective, is desired. In addition, although the foregoing discussion pertains primarily to a signal processing in an A-D conversion for television pictures according to NTSC system, such as normally used in U.S.A. and Japan, there remain problems caused by amplifying the signals to adjust a difference between the signals each based on a different standard for digital encoding even under other systems. Therefore, there also exists a need to develop a technique that can be suitably applied to such cases.

In addition, as a matter of course, qualities of resulting pictures must not be deteriorated as a result of signal adjustments by amplification and the like. Accordingly, it is also desired to develop a technique that can prevent the deterioration of picture qualities caused by such adjustments and the like processing.

SUMMARY OF THE INVENTION

Therefore, it is an object of the present invention to provide a solution to the foregoing problems and drawbacks. According to the present invention, video signal conversion is performed digitally, unlike prior art circuits in which such conversion is performed with analog signals.

This and other objects are accomplished in accordance with the present invention by providing an analog-to-digital converter for converting a video signal comprising:

an A-D converter circuit for converting an analog television signal to a $2^n$-bit digital signal, a synchronizing signal detecting circuit for detecting a synchronizing signal in a digital signal received from the A-D converter circuit, a Y/C separating circuit for separating a luminance signal and a carrier chrominance signal from the digital signal received from the A-D converter circuit utilizing a synchronizing signal supplied from the synchronizing signal detecting circuit, a synchronizing signal converter circuit for converting a synchronizing signal portion of the luminance signal received from the Y/C separating circuit to a predetermined value, and a digital amplifying circuit for amplifying a signal level of a signal received from the synchronizing signal converter circuit by a predetermined multiple value in compliance with a standard for communication or a standard for an apparatus using a video signal.

In the above construction, the $2^n$-bit digital signal may be, for example, an 8-bit digital signal, and the predetermined multiple value by which the signal from the synchronizing signal converter circuit is amplified may be set at, for example, 1.5 times.

In the above construction, the digital amplifying circuit may be constructed by a digital multiplier, or by at least one shifter for shifting the input digital signal a predetermined bit number to the right or to the left and an adder for adding an output signal from the shifter and an original input signal supplied to the digital amplifying circuit.

In addition, a low pass filter for passing a predetermined low frequency component in a digital signal received from the digital amplifying circuit may be provided in the above construction, to eliminate errors such as high frequency caused in the processing and obviously not included in the supplied input video signals.

Further, in the above construction, there may be provided a control section for detecting a predetermined characteristic of an input signal and outputting a control signal corresponding to a detected value and a selector circuit for selecting one of an output signal from the digital amplifying circuit and an output signal from the low pass filter in response to the control signal from the control section.

According to this construction, in consideration of human visual characteristics, the selector circuit appropriately select s and outputs either a signal being closer to an original input signal but having rounding errors, or a signal having smaller rounding errors but having a lower picture quality.

The a control section and the selector circuit may be provided in combination with the digital multiplier, or the shifter and the adder mentioned above.

In addition, the above control section may be a movement detecting control section for detecting a movement in an output signal from the A-D converter circuit or the Y/C separating circuit, and thereby generating such a control signal t hat the selector circuit selects an output signal from the digital amplifying circuit in the case where a detected value is equal to or higher than a threshold value, and selects an output signal from the low pass filter in the case where the detected value is smaller than a threshold value.

According to this construction of the control section, when a video signal to be output is decided as a signal of a moving picture, a signal being close to the original analog signal but having rounding errors is selected to be output, since in the case of moving pictures the rounding errors are not very much noticeable because of such human visual characteristics. On the other hand, when a signal to be output is decided as a signal of a still picture, a low pass filtered signal with a small rounding error is selected to be output, since the rounding error becomes more apparent to human eyes in the case of still pictures.

In addition, the above control section may be a correlation detecting control section for detecting a correlation in an output signal from the A-D converter circuit or the Y/C separating circuit, and thereby generating such a control signal that the selector circuit selects an output signal from the digital amplifying circuit in the case where a detected value is equal to or higher than a threshold value, and selects an output signal from the low pass filter in the case where the detected value is smaller than a threshold value.

According to this construction of the control section, when a video signal to be output is decided to have a weak correlation, a signal being close to the original analog signal but having rounding errors is selected to be output, since in the case of such a signal the rounding error is not much noticeable because of such human visual characteristics. On the other hand, when a signal to be output is decided to have a strong correlation, a low pass filtered signal with a small rounding error is selected to be output, since the rounding error becomes more apparent to human eyes in the case of a signal having a strong correlation.

Further, the above control section may be a movement and correlation detecting control section for detecting both the movement and the correlation in an output signal from the A-D converter circuit or the Y/C separating circuit.

BRIEF DESCRIPTION OF THE DRAWINGS

For a more complete understanding of the present invention, and the advantages thereof, reference is now made to the following descriptions taken in conjunction with the accompanying drawings, in which;

FIG. 4 is a diagram for explaining a signal level in converting an analog television signal to a digital signal.

FIG. 5 is a block diagram showing a construction of a video signal A-D converter according to Example 1 of the present invention.

DESCRIPTION OF THE PREFERRED EMBODIMENTS

Figure 1:
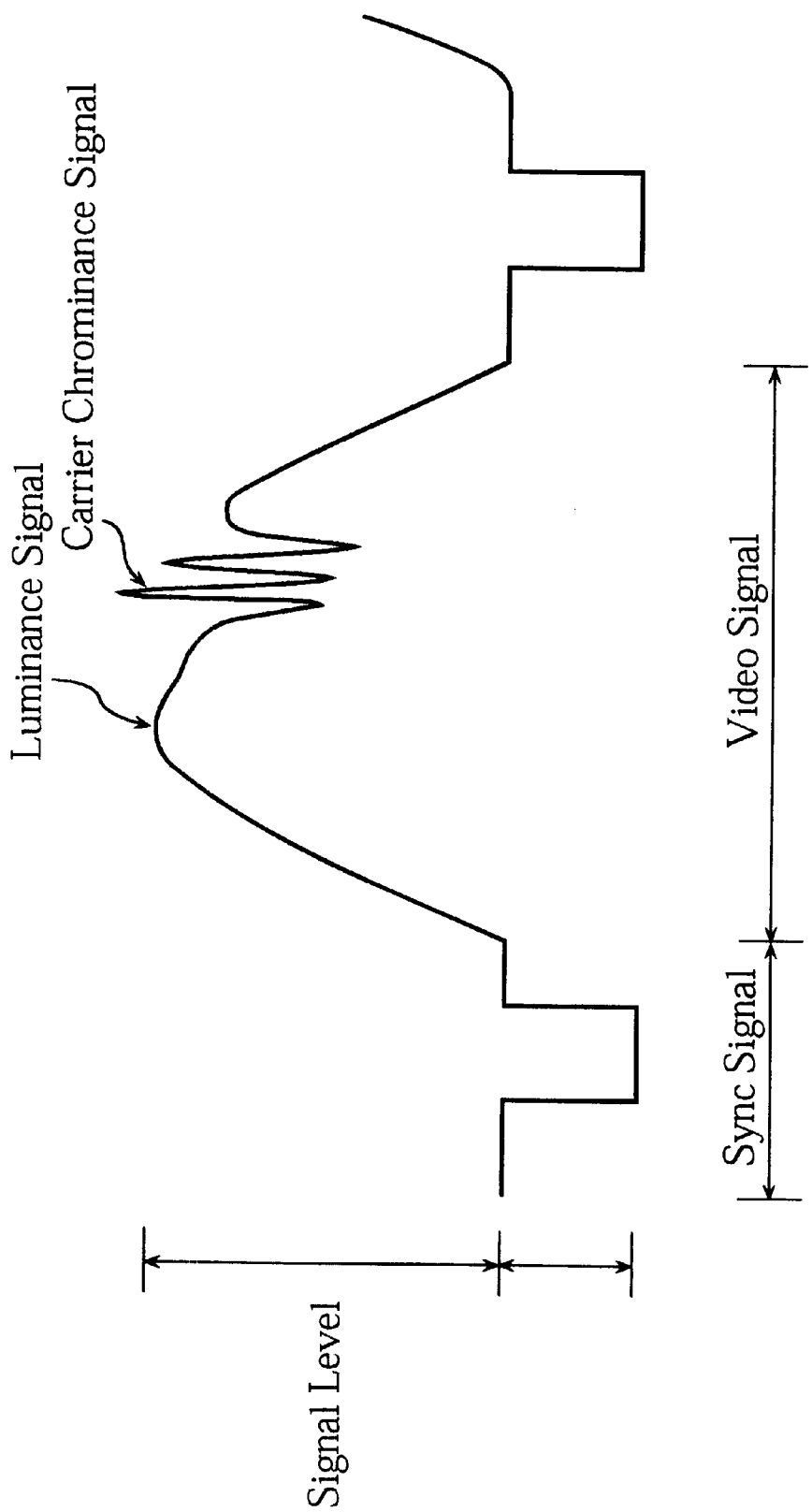
FIG. 1 is a diagram schematically showing a television signal in compliance with the NTSC system.
Figure 2:
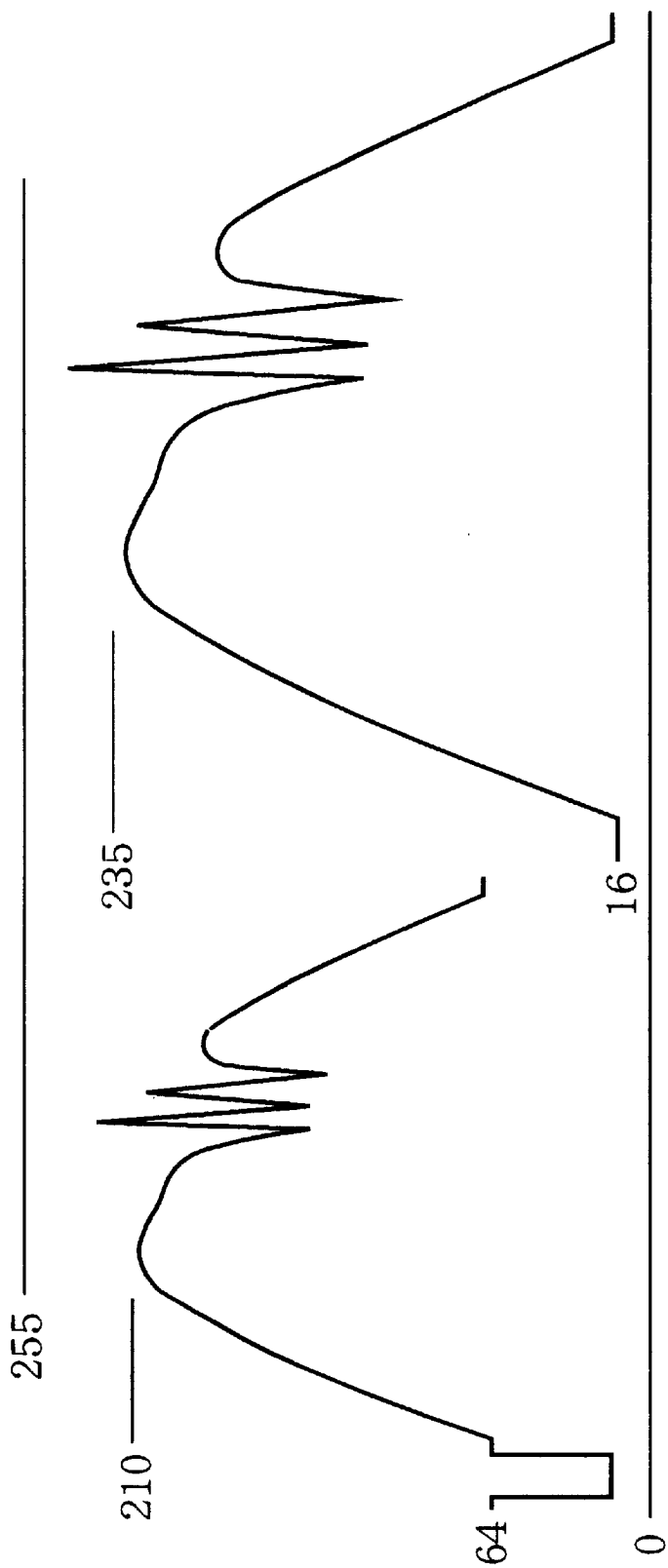
FIG. 2 is a diagram for explaining a conversion of a luminance signal of a video signal A-D converter according to the present invention.
Figure 3:
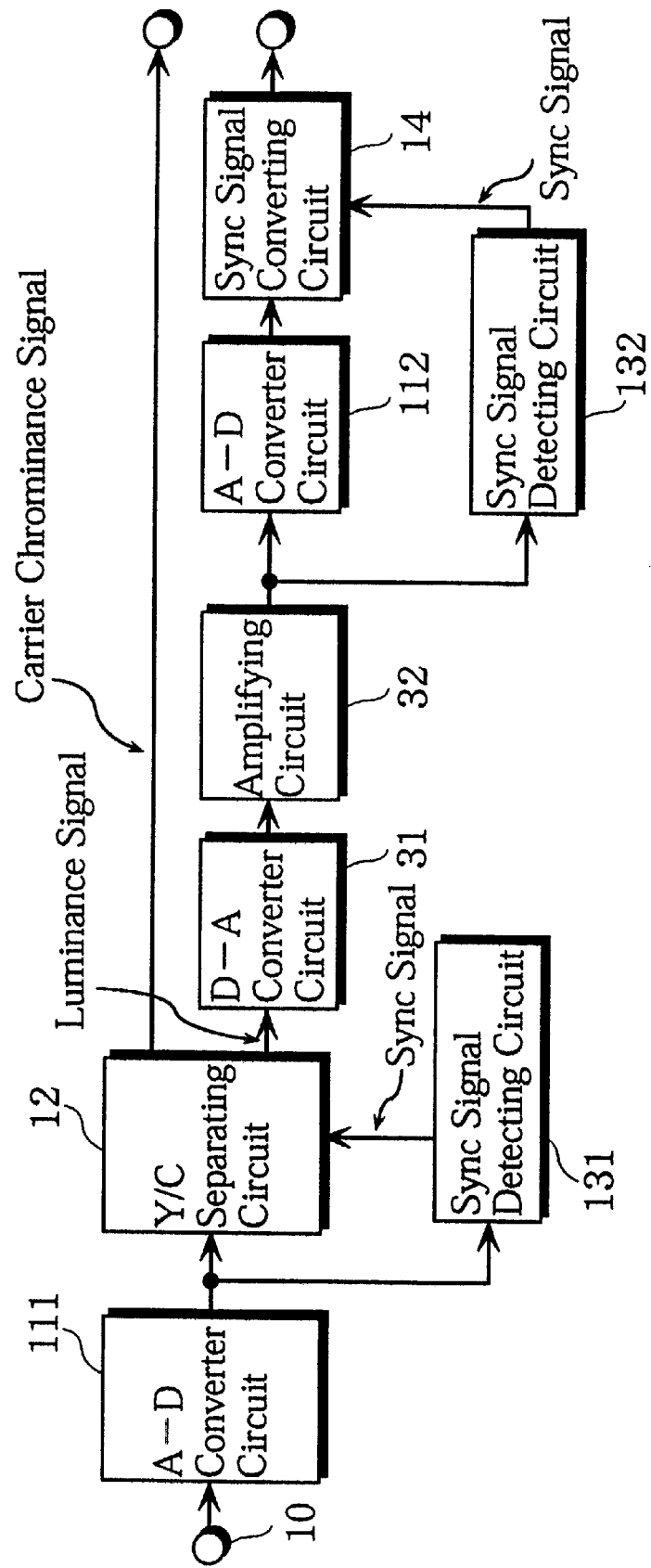
FIG. 3 is a block diagram showing a construction of a prior art video signal A-D converter.

Now, with reference to the figures, the present invention is detailed.

Example 1

FIG. 5 shows a construction of a video signal processing system according to Example 1 of the present invention. In FIG. 5, there are shown an A-D converter circuit 11, a Y/C separating circuit 12, a synchronizing signal detecting circuit 13, a synchronizing signal converting circuit 14, and a digital amplifying circuit 15. The detail of the system is now described below.

Firstly, an analog television signal, such as an analog NTSC television signal, is supplied from an input terminal 10 into the A-D converter circuit 11, and the analog signal is converted to an 8-bit digital signal by the A-D converter circuit 11. The output signal levels from the A-D converter circuit 11 are a black level being 64/255 and a white peak level being 210/255, as shown in FIG. 4, and these are the same as in prior art systems. Then, the synchronizing signal detecting circuit 13 detects a synchronizing signal from the 8-bit digital signal. Utilizing the detected synchronizing signal, the Y/C separating circuit 12 separates the 8-bit digital signal supplied from the A-D converter circuit 11 into a luminance signal and a carrier chrominance signal. At this stage, the signal levels of the luminance signal are the black level being 64/255 and the peak white level being 210/255. Utilizing the synchronizing signal supplied from the synchronizing signal detecting circuit 13, the synchronizing signal converting circuit 14 fixes a signal level of a synchronizing signal portion of the luminance signal to be, for example, 64/255. Finally, the signal supplied from the synchronizing signal converting circuit 14 is converted by the digital amplifying circuit 15 into a signal having a black level of 16/255 and a peak white level of 235/255, and the converted signal is output as a signal in compliance with a digital encoding standard.

Now, the description details the operation of the digital amplifying circuit 15.

In the synchronizing signal converting circuit 14, the black level is assumed to be 64/255, the peak white level to be 210/255, and the level of an output signal from the synchronizing signal converting circuit to be X. In the signal levels in the digital amplifying circuit 15, the black level is assumed to be 16/255 and the peak white level to be 235/255.

Accordingly, a signal level Y of an output signal from the digital amplifying circuit 15 corresponding to the signal X is represented by the following equation, $$Y=(235-16)/(210-64)\times(X-64)=1.5\times(X-64)=\{1+(1/2)\}\times(X-64).$$

Figure 6A:
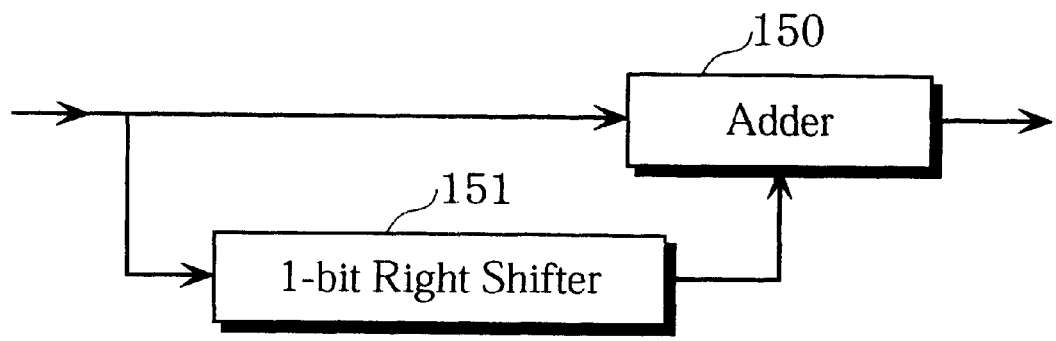
FIG. 6 is a block diagram showing a construction of a digital amplifying circuit in a video signal A-D converter according to the present invention.

FIG. 6(a) schematically shows a circuit for this operation.

In an 8-bit digital circuit, making an input signal to be 1/2 means that the 8-bit signal is shifted one bit to the right (the least significant bit is shifted off). Accordingly, the digital amplifying circuit 15 can be a simple circuit that comprises an adder 150 and a right shifter 151 for shifting an input signal one bit to the right, as shown in FIG. 6(a).

This operation is for the case of processing a digital image with 8-bit signals. However, the present invention can be suitably applied to the case of a high definition television broadcasting, where the data is 10-bit data.

Figure 6B:
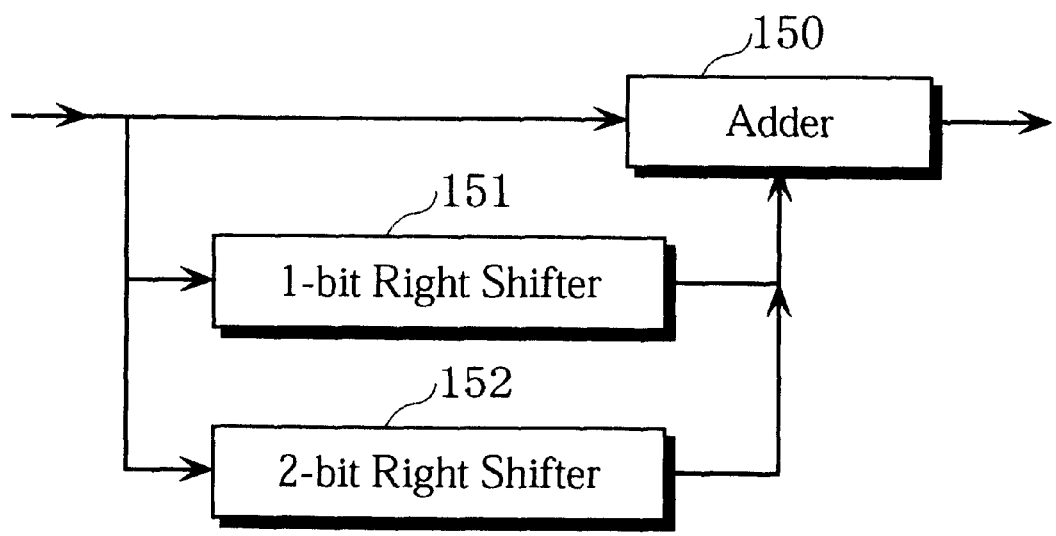

It is also noted that an amplifying circuit for amplifying the signal to a signal in compliance with a certain standard can be readily constructed by appropriately combining shifters. FIG. 6(b) shows an example of a construction of such a digital amplifying circuit that further comprises a right shifter 152 for shifting the input signal two bits to the right, thereby amplifying the input signal by 1.75 times.

In addition, for the digital amplifying circuit 15, it is possible to employ a circuit that shifts an input signal one bit to the left, a digital multiplier, and the like, depending on necessity.

Example 2

Figure 7:
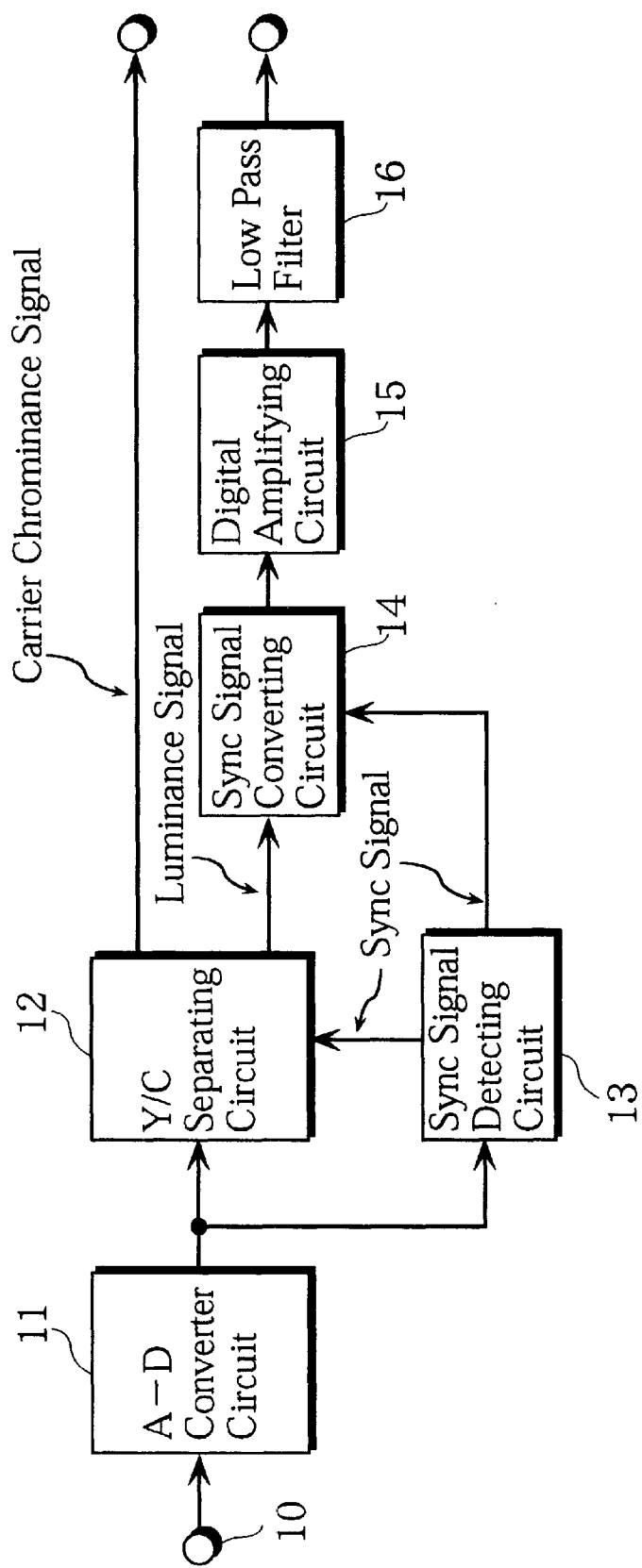
FIG. 7 is a block diagram showing a construction of a video signal A-D converter according to Example 2 of the present invention.

FIG. 7 shows a construction of a video signal converter according to Example 2 of the present invention.

The video signal converter of Example 2 differs from the abovedescribed Example 1 in that a low pass filter 16 is provided at a subsequent stage of the digital amplifying circuit 15.

Apart from this, the video signal converter of Example 2 has the same construction as that of Example 1. Therefore, the same reference characters are used for the corresponding parts and the explanation thereof is omitted for the sake of brevity. Now, the effects of the converter of Example 2 are detailed, below.

An analog television signal, such as an analog NTSC television signal, supplied to the system is processed in the same manner as in Example 1. Accordingly, the supplied signal is converted by the digital amplifying circuit 15 into a signal with a black level of 16/255 and a peak white level of 235/255, so as to comply with a digital encoding standard. The converted signal is then supplied to the low pass filter 16.

Figure 8:
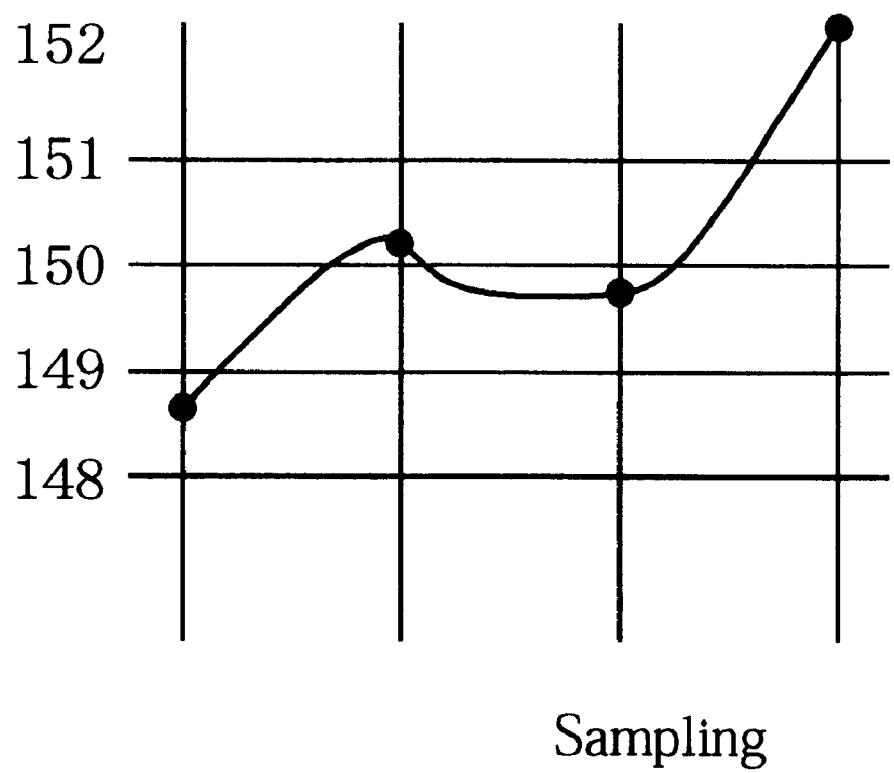
FIG. 8 is a diagram for explaining rounding errors in operation, showing a supplied analog signal and a sampling point thereof.
Figure 9:
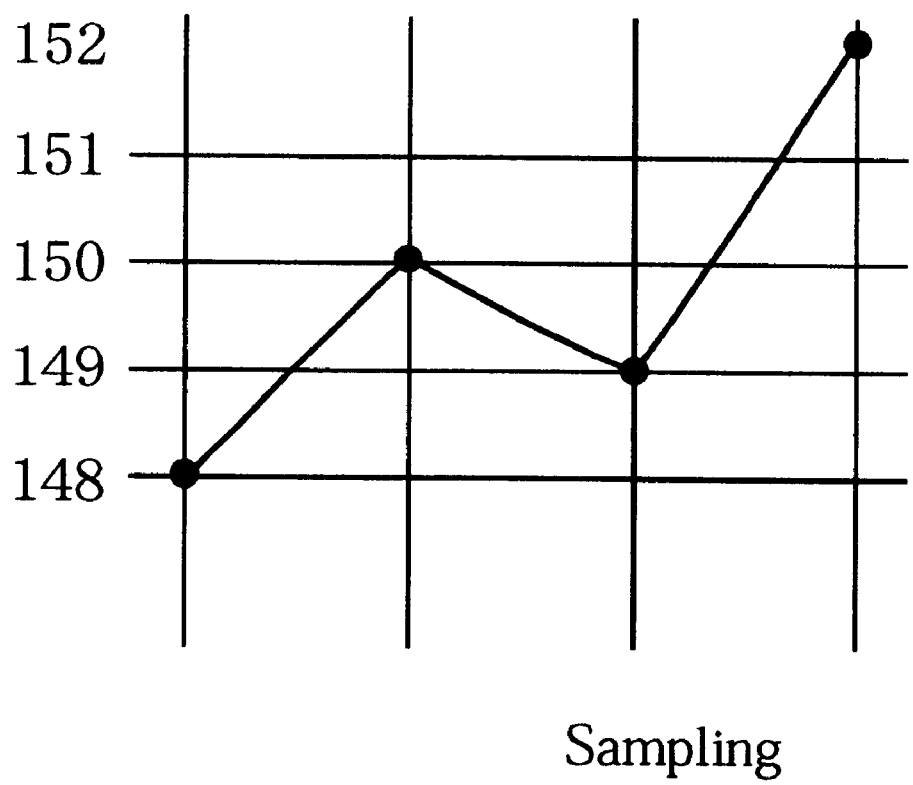
FIG. 9 is a diagram for explaining rounding errors of operation, showing a digital value at the sampling point.

According to a digital amplifying of Example 1, in the case where an analog signal as shown in FIG. 8 is supplied to the A-D converter circuit 11, the A-D converter circuit 11 rounds off the signal and outputs a resulting signal as shown in FIG. 9. The resulting signal is supplied to the digital amplifying circuit 15 and amplified by 1.5 times, and thereby an output signal from the digital amplifying circuit 15 results in a waveform as shown in FIG. 10.

Figure 10:
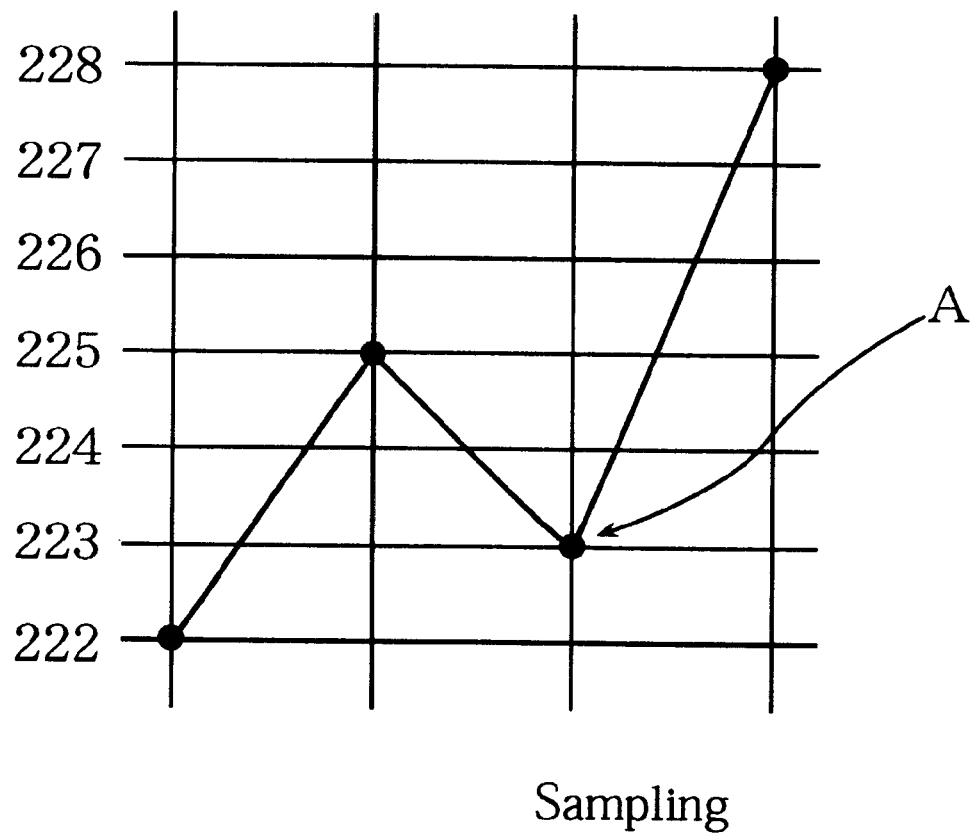
FIG. 10 is a diagram for explaining rounding errors of operation, showing the values of the digital values shown in FIG. 9 multiplied by 1.5.
Figure 11:
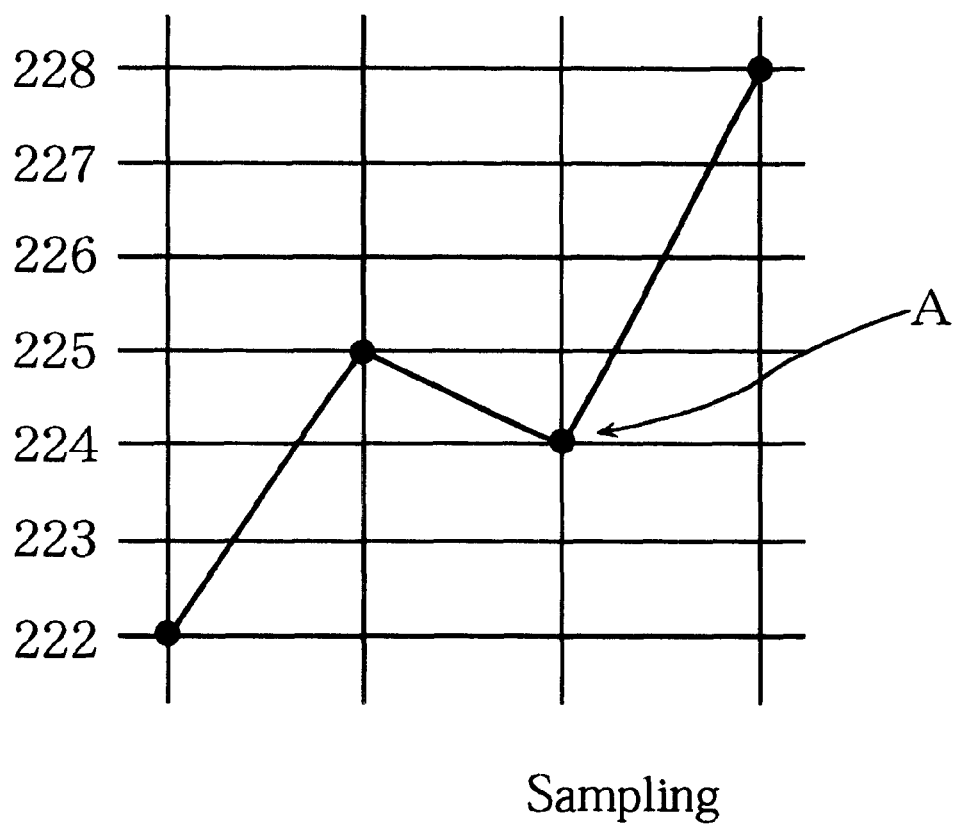
FIG. 11 is a diagram for explaining rounding errors of operation, showing digital values of the signal after passing through a low pass filter.

In FIG. 10, as seen from an adjacent area to a sampling point A, a waveform not present in the original analog signal is produced, and rounding errors in operation becomes apparent around the sampling point A. In view of this problem, in Example 2, the output signal from the digital amplifying circuit 15 is low pass filtered by the low pass filter 16 to cut off a high frequency of 6 MHz or higher. Such a high frequency is not contained in an original signal of the NTSC system. Accordingly, as shown in FIG. 11, a position of the point A is compensated and the rounding error in operation is reduced, resulting in an excellent display performance.

It is noted that a frequency to be cut off by the low pass filter 15 may be other frequencies than the frequency described above, and may be made to be adjustable, depending upon types of broadcasting or communication and types of images to be displayed.

Example 3

Figure 12:
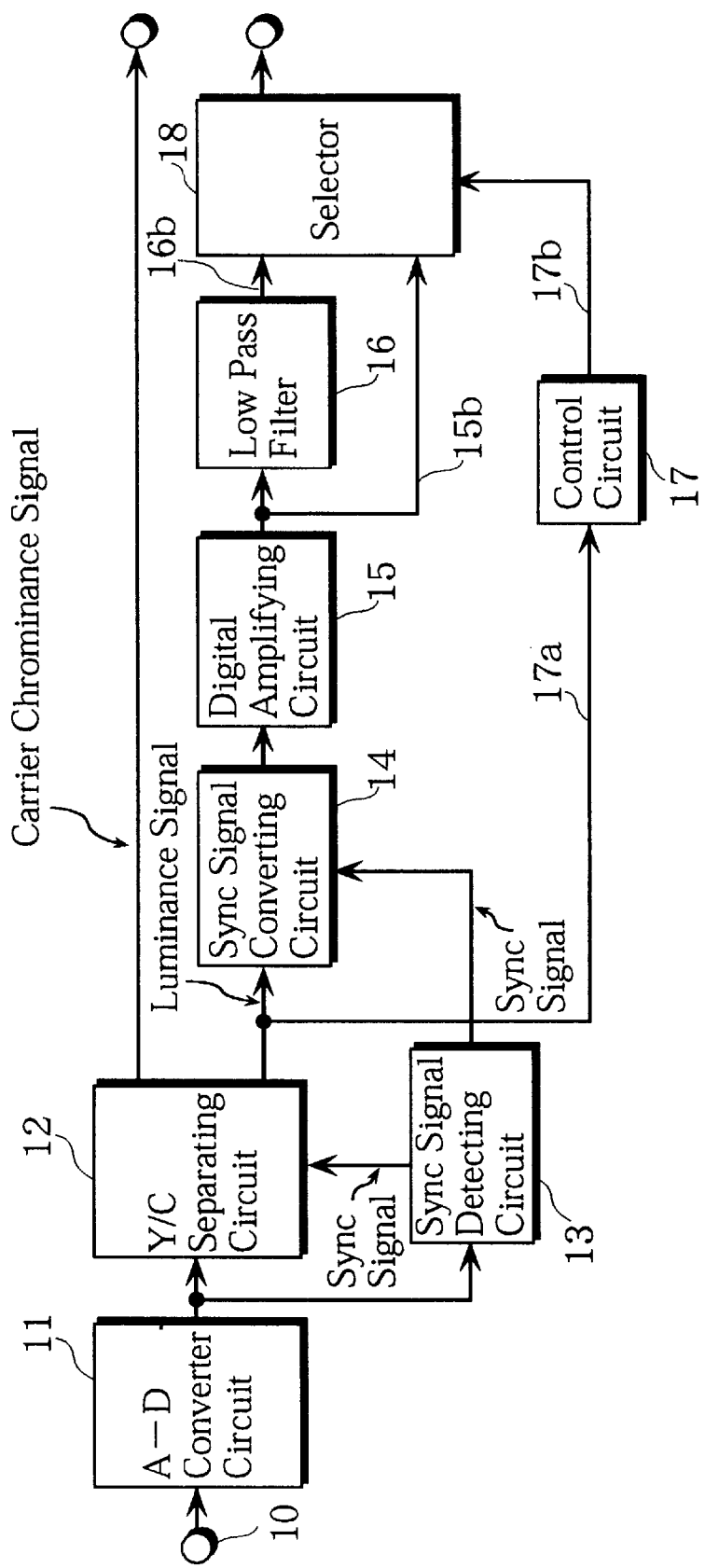
FIG. 12 is a block diagram showing a construction of a video signal A-D converter according to Example 3 of the present invention.

FIG. 12 shows a construction of a video signal A-D converter in accordance with Example 3 of the present invention.

Example 3 differs from the above Example 2 in that a control circuit 17 and a selector 18 are further provided. Apart from this, this example has the same construction as Example 2. Therefore, the same reference characters are used for the corresponding parts, and the descriptions for these parts are omitted for the sake of brevity.

A signal 17a is branched from a signal line connecting the Y/C separating circuit 12 and the synchronizing signal converting circuit 14, and is connected with a control circuit 17. An output signal 17b from the control circuit 17 is supplied to the selector 18. An output signal 16b from the low pass filter 16 is also supplied to the selector 18. An output signal 15b is branched from a signal line connecting the digital amplifying circuit 15 and the low pass fiter 16, and is supplied to the selector 18. The control circuit 17 receives a luminance signal supplied from the Y/C separating circuit 12, processes the signal in such a manner as described below, and outputs a predetermined selecting signal to the selector 18. The selector 18 selects an output signal between the output signal 15b from the digital amplifying circuit 15 and the output signal 16b from the low pass filter 16 in response to the predetermined selecting signal supplied by the control circuit 17, and outputs a selected signal accordingly.

Now, referring to FIGS. 13(a) to 13(c), some examples of construction for the control circuit 17 shown in FIG. 12 are described below.

Figure 13A:
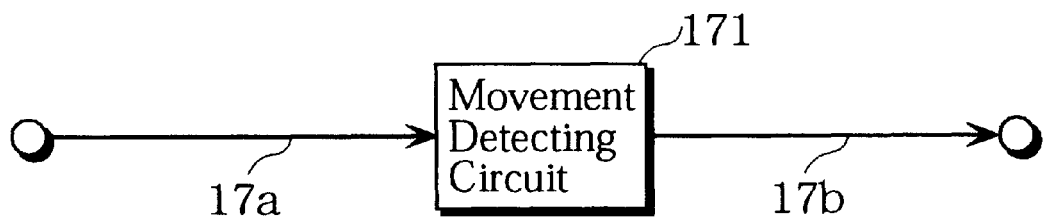
FIG. 13 is a diagram showing a construction of a control circuit of a video signal A-D converter according to the present invention.

FIG. 13(a) shows an example in which the control circuit of FIG. 12 is composed of a movement detecting circuit 171 for detecting a movement of a sectional part in a video image by utilizing a correlation between frames.

Figure 14A:
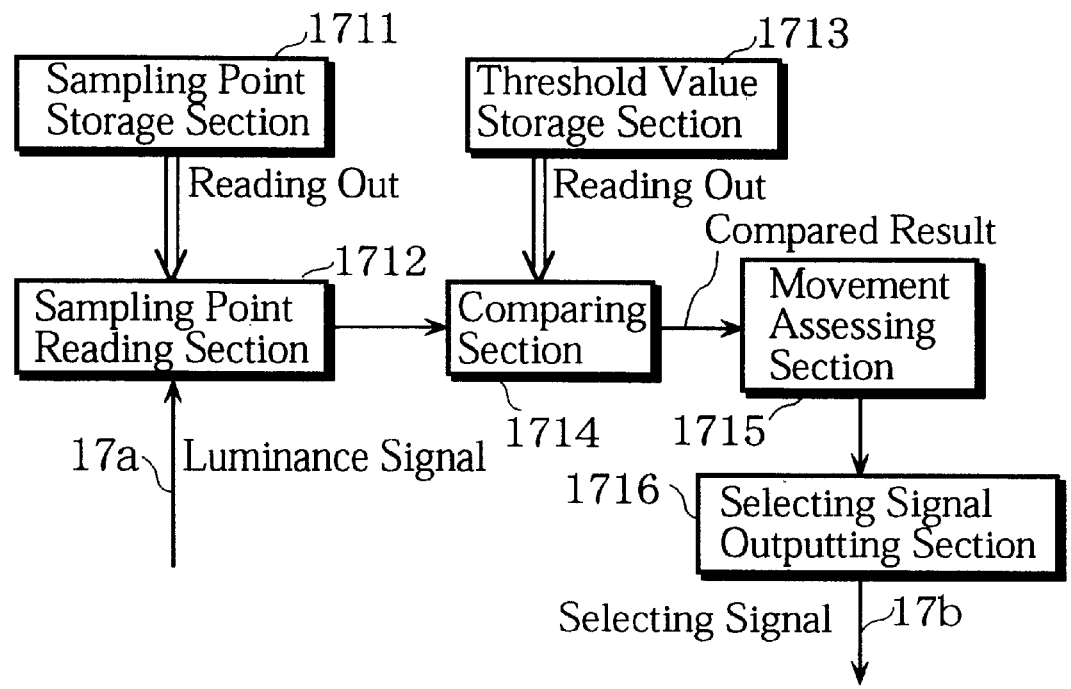
FIG. 14 is a diagram showing a construction of a control circuit for detecting a movement in a picture, and a processing procedure thereof.
Figure 14B:
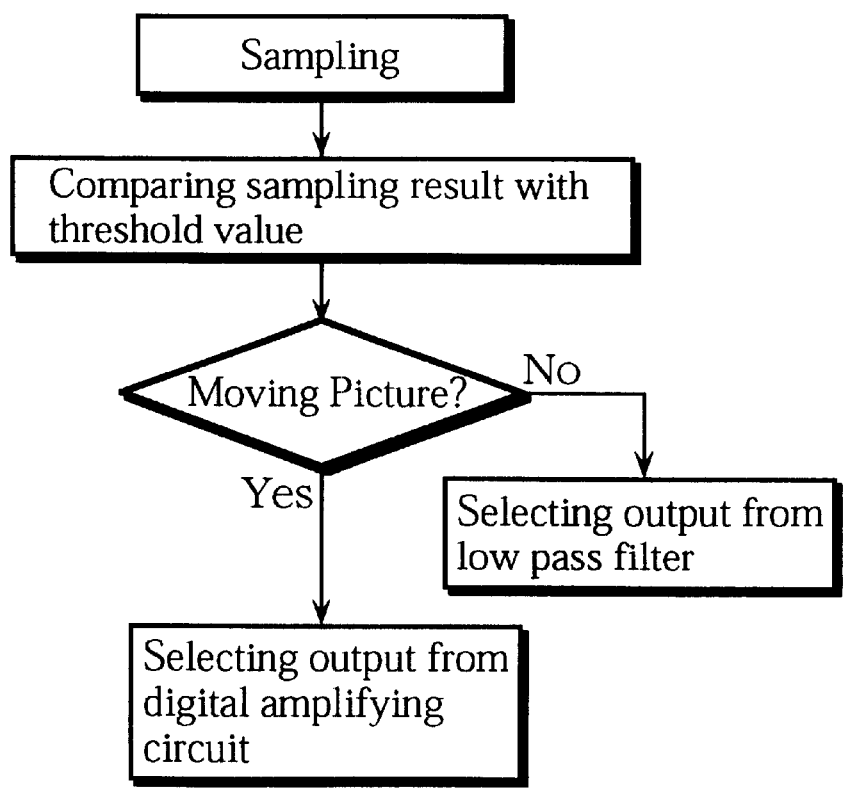

FIG. 14(a) schematically shows a construction of the movement detecting circuit 171, and FIG. 14(b) shows an outline of the processing thereof.

Referring now to FIG. 14(a), there are shown a sampling point storage section 1711, a sampling point reading section 1712, a threshold value storage section 1713, a comparing section 1714, a movement assessing section 1715, and a selecting signal outputting section 1716.

The mechanism of movement detection is as follows. The sampling point reading section 1712 reads out a sampling point pre-stored in the sampling point storing section 1711, and, with reference to the stored data of the sampling point, obtains from the luminance signal a value corresponding to a coordinate X in a frame and a value corresponding to the same coordinate X in another frame that precedes the frame by one frame. Then, these two values are supplied to the comparing section 1714. The comparing section 1714 compares a difference value between the two values with a data pre-stored in the threshold value storage section 1713, and outputs a result of the comparison to the movement assessing section 1715. The movement assessing section 1715 decides whether the image data is a moving picture or a still picture on the basis of the supplied result, and outputs a result of the decision to the selecting signal outputting section 1716. The selecting signal outputting section 1716 outputs a selecting signal according to the result of the decision from the movement assessing section 1715. A process flow of the movement detection described above is schematically shown in FIG. 14(b).

Accordingly, in the case of a signal corresponding to a moving picture, the selector 18 selects a signal not low pass filtered, which is supplied from the digital amplifying circuit 15. In the case of a signal corresponding to a still picture, the selector 18 selects a low pass filtered signal, which is supplied from the low pass filter 16. By low pass filtering the output signal from the digital amplifying circuit 15 with the low pass filter 16, rounding errors in the operation are rendered inconspicuous, and therefore the low pass filtered signal is suitable for a still picture. On the other hand, the signal not low pass filtered by the low pass filter 16 is suitable for a moving picture. The reason is that viewer's visual resolution decreases according to human visual characteristics when a moving picture is viewed, and therefore the rounding errors in processing practically raise no problem.

Thus, according to this construction, when an input video signal is a moving picture signal, it is made possible to reduce the degradation of the luminance signal to be output from the selector 18.

Figure 13B:
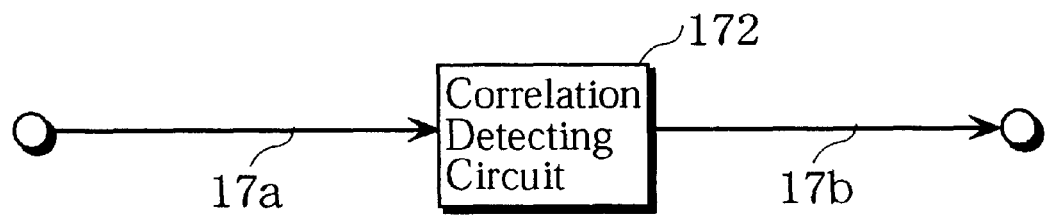

Now referring to FIG. 13(b), there is shown an example in which the control circuit 17 of FIG. 12 is composed of a correlation detecting circuit 172 for detecting a correlation of luminance in a field.

An example of a method for detecting a correlation is as follows.

Firstly, in an input signal 17a, the correlation detecting circuit 172 calculates an average of the luminance value in a coordinate Y and eight other coordinates adjacent to Y in a field (of the eight coordinates, four of the points being upward, downward, leftward, and rightward with respect to the coordinate Y, and the rest being four diagonally situated coordinates). When the calculated average value is equal to or more than a predetermined reference value, the correlation detecting circuit 172 decides that there exists a correlation in the field. On the other hand, when the average value is below the predetermined reference value, the correlation detecting circuit 172 decides that there exists no correlation in the field. The correlation detecting circuit 172 then supplies to the selector 18 a selecting signal corresponding to the result of the decision.

In response to the selecting signal, the selector 18 selects a signal not low pass filtered by the low pass filter 16 when receiving a signal corresponding to the case where there exists no correlation, and selects a low pass filtered signal when receiving a signal corresponding to the case where there exists correlation.

Because of human visual characteristics, the rounding errors in operation are more apparent when a correlation in a region adjacent to a sampling point is large in a field, while the errors are inconspicuous when the correlation is small. In view of this, according to this example, by detecting the case where the correlation is small and thus the rounding errors are inconspicuous, a signal not low pass filtered by the low pass filter 16 is selected since the rounding errors do not cause problems in such a case.

Therefore, in the case where it is decided an input signal has no correlation in a field, the deterioration of the luminance signal to be output from the selector 18 is reduced.

It is noted that the basic construction and the processing of the correlation detecting circuit is similar to the movement detecting circuit as described above, and therefore the figure for explaining the construction is omitted for the sake of brevity.

Figure 13C:
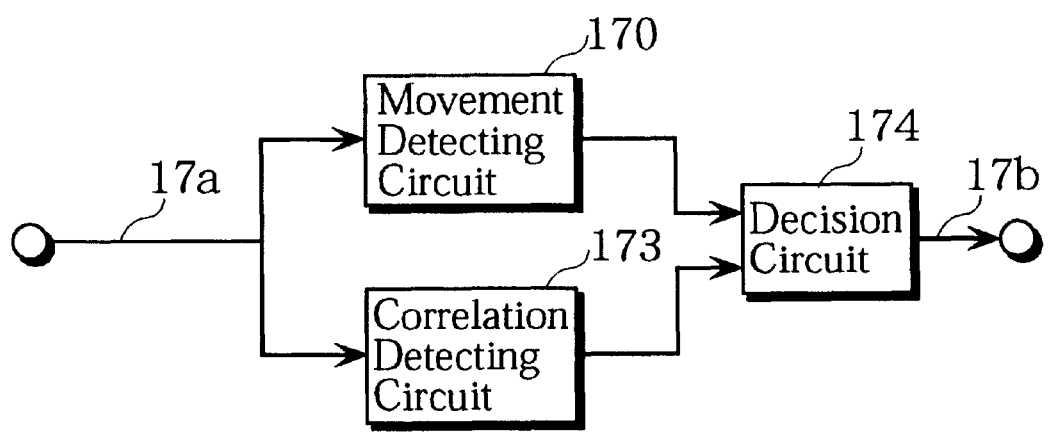

Now, referring to FIG. 13(c), there is shown an example in which the control circuit 17 is a movement and correlation detecting circuit that comprises a movement detecting circuit 170, a correlation detecting circuit 173, and a decision circuit 174.

In this control circuit 17, the movement detecting circuit 170 detects whether an input signal is a moving picture signal or a still picture signal, and the correlation detecting circuit 173 detects whether there exists a correlation in a predetermined field. The decision circuit 174 outputs such a signal that the selector 18 selects a low pass filtered signal through the low pass filter 16 only in the case where an input signal is a still picture signal and shows a correlation in the field, and selects a signal not low pass filtered in the rest of the cases.

According to the above construction, only in the case where an input signal is a signal for a still picture and shows a correlation in a field, i.e., only in the case where the rounding errors in operation are apparent, a low pass filtered signal supplied from the low pass filter 16 is selected. Therefore, it is made possible to further restrict a range where a low pass filtered signal should be selected.

According to the above construction, it is achieved that the degradation of a luminance signal to be output from the selector 18 is reduced except in the case where an input video signal is a signal for a still picture and shows a correlation in a field.

Although the present invention has been detailed with reference to preferred embodiments thereof, those having ordinary skill in the art will readily realize that various modifications are possible without departing from the scope and spirits of the present invention.

For example, the following constructions may be employed.

(1) Each section, block, or the like in the present invention may be physically divided into a plurality, or may be combined together depending upon conditions in fabrication and the like conditions.

(2) The sampling frequency may be other frequencies, and the frequency to be cut off by the low pass filter may be changed accordingly. Further, it is possible to employ such a construction that the cut-off frequency can be adjusted by a user depending upon conditions of the input analog video signal.

(3) The converter may be a device for an exclusive use of converting a conventional analog video signal to a digital video signal, and therefore may have no recording means and display means.

(4) The display for the A-D converter of the present invention is not limited to a CRT, and may be a liquid crystal display and the like display.

(5) In Example 3, the control circuit may receive an input signal directly from the A-D converter circuit. In addition, in order to detect each frame with high accuracy, a synchronizing signal and/or a clock signal may be supplied to the control circuit. Further, the correlation detecting circuit may be so constructed as to detect a correlation of chrominance in a field.

(6) Each of the circuits may be so constructed and programmed that they can perform a processing suitable for both types of signals for a conventional NTSC system and a high definition television system, by automatically detecting or being input by a user which type of signal is input to the system. Required circuits may be provided for each system so as to be selected depending on the types of input signals.

Other similar modifications would also be apparent to those skilled in the art, and are intended to be encompassed within the appended claims.

What is claimed is:

1. An analog-to-digital converter for converting a video signal comprising:

an A-D converter circuit for converting an analog television signal to a $2^n$-bit digital signal, a synchronizing signal detecting circuit for detecting a synchronizing signal in a digital signal received from the A-D converter circuit, a Y/C separating circuit for separating a luminance signal and a carrier chrominance signal from the digital signal received from the A-D converter circuit utilizing a synchronizing signal supplied from the synchronizing signal detecting circuit, a synchronizing signal converter circuit for converting a synchronizing signal portion of the luminance signal received from the Y/C separating circuit to a predetermined value, and digital amplifying circuit for amplifying a signal level of a signal received from the synchronizing signal converter circuit to a predetermined signal level in compliance with a standard for communication or a standard for an apparatus using a video signal, a low pass filter for passing a predetermined low frequency component in a digital signal received from the digital amplifying circuit, a control section for detecting a predetermined characteristic of an input signal and outputting a control signal corresponding to a detected value, and a selector circuit for selecting one of an output signal from the digital amplifying circuit and an output signal from the low pass filter in response to the control signal from the control section.

2. An analog-to-digital converter for converting a video signal according to claim 1, in which said digital amplifying circuit is composed of a digital multiplier, or at least one shifter and an adder for adding an output signal from the shifter and an input signal supplied to the digital amplifying circuit.

3. An analog-to-digital converter for converting a video signal according to claim 2, in which:

said control section is a movement detecting control section for detecting a movement in an output signal from the A-D converter circuit or the Y/C separating circuit, and thereby generating such a control signal that the selector circuit selects an output signal from the digital amplifying circuit in the case where a detected value is equal to or higher than a threshold value, and selects an output signal from the low pass filter in the case where the detected value is smaller than a threshold value.

4. An analog-to-digital converter for converting a video signal according to claim 2, in which:

said control section is a correlation detecting control section for detecting a correlation in an output signal from the A-D converter circuit or the Y/C separating circuit, and thereby generating such a control signal that the selector circuit selects an output signal from the digital amplifying circuit in the case where a detected value is equal to or higher than a threshold value, and selects an output signal from the low pass filter in the case where the detected value is smaller than a threshold value.

5. An analog-to-digital converter for converting a video signal according to claim 2, in which:

said control section is a movement and correlation detecting control section for detecting a movement and a correlation in an output signal from the A-D converter circuit or the Y/C separating circuit, and thereby generating such a control signal that the selector circuit selects an output signal from the digital amplifying circuit in the case where a detected value of movement and a detected value of correlation are both equal to or higher than a threshold value, and selects an output signal from the low pass filter in the rest of the cases.

6. An analog-to-digital converter for converting a video signal according to claim 1, in which:

said control section is a movement detecting control section for detecting a movement in an output signal from the A-D converter circuit or the Y/C separating circuit, and thereby generating such a control signal that the selector circuit selects an output signal from the digital amplifying circuit in the case where a detected value is equal to or higher than a threshold value, and selects an output signal from the low pass filter in the case where the detected value is smaller than a threshold value.

7. An analog-to-digital converter for converting a video signal according to claim 1, in which:

said control section is a correlation detecting control section for detecting a correlation in an output signal from the A-D converter circuit or the Y/C separating circuit, and thereby generating such a control signal that the selector circuit selects an output signal from the digital amplifying circuit in the case where a detected value is equal to or higher than a threshold value, and selects an output signal from the low pass filter in the case where the detected value is smaller than a threshold value.

8. An analog-to-digital converter for converting a video signal according to claim 1, in which:

said control section is a movement and correlation detecting control section for detecting a movement and a correlation in an output signal from the A-D converter circuit or the Y/C separating circuit, and thereby generating such a control signal that the selector circuit selects an output signal from the digital amplifying circuit in the case where a detected value of movement and a detected value of correlation are both equal to or higher than a threshold value, and selects an output signal from the low pass filter in the rest of the cases.

9. A signal level converter for converting a signal level of a video signal into a predetermined signal level in compliance with a predetermined standard, comprising:

a signal amplitude converting section for converting the signal level of the video signal into the predetermined signal level in compliance with the predetermined standard;

a low pass filter for passing a predetermined low frequency component of a signal received from the signal amplitude converting section;

a control section for detecting a predetermined characteristic of an input signal thereto and outputting a control signal corresponding to the detected value; and a selector section for selecting one of an output signal from the signal amplitude converting section and an output signal from the low pass filter in response to the control signal from the control section.

10. An analog-to-digital converter for converting a signal level of a video signal into a predetermined signal level in compliance with a predetermined standard, comprising:

a signal amplitude converting section for converting the signal level of the video signal into the predetermined signal level in compliance with the predetermined standard;

a low pass filter for passing a predetermined low frequency component of a signal received from the signal amplitude converting section;

a control section for detecting a predetermined characteristic of an input signal thereto and outputting a control signal corresponding to the detected value; and a selector section for selecting one of an output signal from the signal amplitude converting section and an output signal from the low pass filter in response to the control signal from the control section.

11. An analog-to-digital converter for converting a video signal, comprising:

an A-D converter circuit;

a digital amplifying circuit for amplifying a signal level of a signal received from the A-D converter into a predetermined signal level in compliance with a predetermined standard;

a low pass filter for passing a predetermined low frequency component of the digital signal received from the digital amplifying circuit;

a control section for detecting a predetermined characteristic of an input signal thereto and outputting a control signal corresponding to the detected value; and a selector circuit for selecting one of an output signal from the digital amplifying circuit and an output signal from the low pass filter in response to the control signal supplied from the control section.

* * * * *

UNITED STATES PATENT AND TRADEMARK OFFICE
CERTIFICATE OF CORRECTION

PATENT NO. : 6,483,550 B1
DATED : November 19, 2002
INVENTOR(S) : Hisaji Murata and Toshihiro Miyoshi It is certified that error appears in the above-identified patent and that said Letters Patent is hereby corrected as shown below:

<u>Title page,</u>
Item [75], change "[75] Inventors: Hisaji Murata, Katano (JP)" to
-- [75] Inventors: Hisaji Murata, Katano-shi (JP) --.

<u>Column 10,</u>
Line 28, add -- a -- before "digital".

Signed and Sealed this

Seventeenth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,483,550 B1
DATED : November 19, 2002
INVENTOR(S) : Hisaji Murata and Toshihiro Miyoshi It is certified that error appears in the above-identified patent and that said Letters Patent is hereby corrected as shown below:

<u>Title page,</u>
Item [75], Inventors, change "Hisaji Murata, Katano (JP)" to -- Hisaji Murata, Katano-shi (JP) --.

<u>Column 10,</u>
Line 28, add "a" before "digital";
Lines 51 and 63, change "2" to -- 1 --;

<u>Column 11,</u>
Line 8, change "2" to -- 1 --;
Lines 20, 32 and 45, change "1" to -- 2 --.

Signed and Sealed this

Twenty-third Day of September, 2003

JAMES E. ROGAN
*Director of the United States Patent and Trademark Office*